United States Patent [19]

Lagain

[11] 4,406,173

[45] Sep. 27, 1983

[54] CONTROL DEVICE FOR RECIPROCATING MEMBER

[76] Inventor: Georges Lagain, 46, rue de la Ronce, Ville-d'Avray, France, 92410

[21] Appl. No.: 218,301

[22] Filed: Dec. 19, 1980

[30] Foreign Application Priority Data

Jan. 3, 1980 [FR] France .............................. 80 00076

[51] Int. Cl.³ ........................................... F16H 25/08
[52] U.S. Cl. ........................................ 74/54; 74/567; 74/569
[58] Field of Search .................... 74/569, 568 FS, 567, 74/54, 55

[56] References Cited

U.S. PATENT DOCUMENTS 2,553,846  5/1951  Clemens ................................. 74/54
3,274,838  9/1966  Kelch ..................................... 74/567
3,543,589  12/1970  Loughran .............................. 74/54

Primary Examiner—Werner H. Schroeder
Assistant Examiner—Steven N. Meyers
Attorney, Agent, or Firm—Fitzpatrick, Cella, Harper & Scinto

[57] ABSTRACT

The invention relates to a reciprocating member.

The movable member is integral with one of the ends of a spring plate, whose other end is secured to a fixed frame, the said spring plate being held under pressure by way of a support member such as a cam driven in rotation.

The invention finds an application in machines used for the manufacture of plastic bags.

2 Claims, 1 Drawing Figure

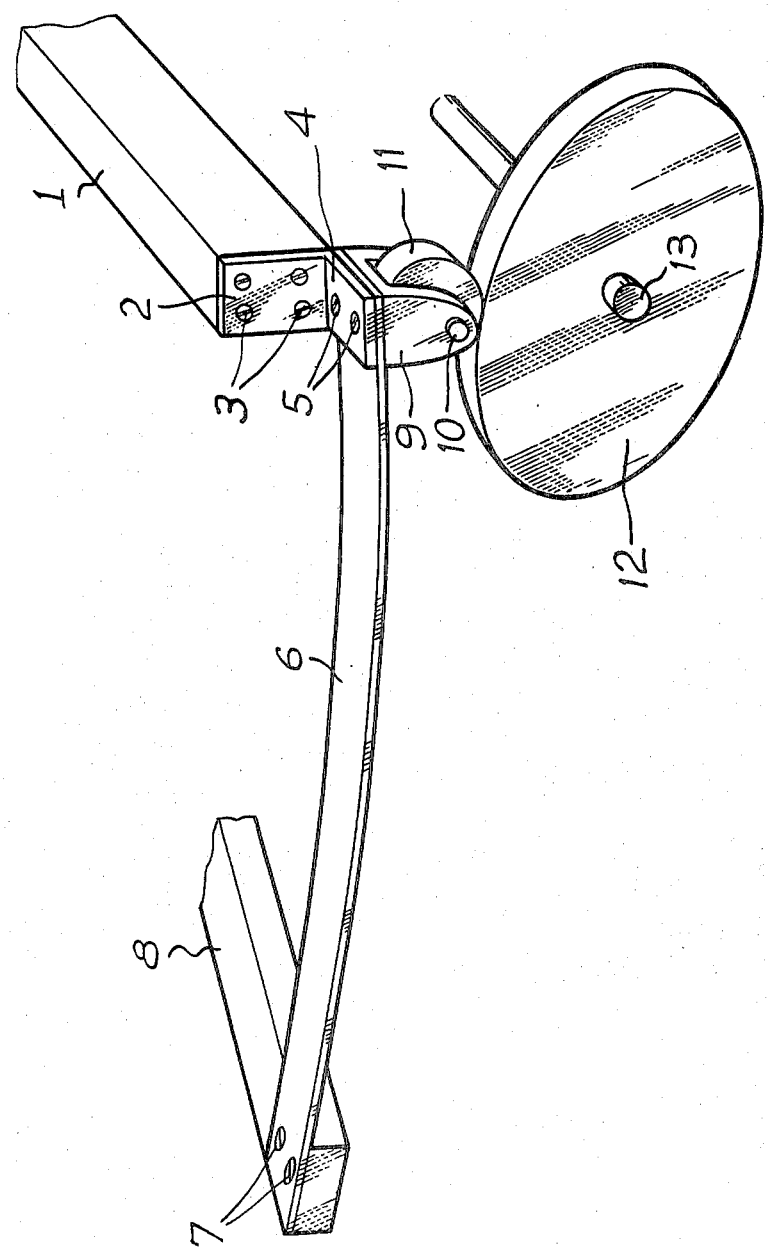

CONTROL DEVICE FOR RECIPROCATING MEMBER

The present invention relates to a control device for a reciprocating member.

In order to transfer a reciprocating movement to a member of a machine, it is known to use drive members which comprise runners mounted for sliding inside ball bearings or the like, the said rods being supported via support members or cam-followers by a cam driven in rotation. The outline of the cam is designed so as to transfer a particular reciprocating movement to the movable member. Elastic return means such as spiral springs are used to ensure a permanent contact of the cam-follower with the cam.

It is the object of the invention to simplify considerably this device for controlling a reciprocating member.

According to the invention, the movable member is integral with one of the ends of a spring plate, whose other end is secured to a fixed frame, the said spring plate being held under pressure by way of a support member such as a cam driven in rotation.

It is then possible with this particular arrangement to eliminate complicated drive means consisting of guide rods mounted inside bearings and of elastic return means.

The invention will be more readily understood on reading the following description with reference to the accompanying drawing.

The single FIGURE in the drawing illustrates a device according to the invention which comprises a movable member 1 constituted for example by a welding and cutting clamp mounted on a machine for manufacturing plastic bags, the said movable member being driven with a reciprocating movement.

At one of the ends of the movable member 1 is fixed by means of screws 3, one of the branches 2 of an L-iron, whose other branch 4 is secured by means of screws 5, to one of the ends of a spring plate 6 fixed at its other end, by means of screws 7, to an element 8 of the fixed frame partly shown in the drawing. On one free end of the spring plate 6 supporting the L-iron 2,4, is fixed a bearing 9 supporting a shaft 10 on which is mounted for free rotation a cam-follower 11 resting against the periphery of a cam 12, whose shaft 13 is driven in rotation by a driving member not shown in the drawing.

The spring plate 6 is held under pressure so that the cam-follower 11 is constantly in close contact with the cam 12. Moreover, the L-iron 2, 4 is also constituted by a spring which allows the expansion of the clamp without any reaction on the branch 4 of the L-iron integral with the spring plate 6.

This arrangement according to the invention allows, when the cam 12 is driven in rotation, a corresponding displacement of the cam-follower 11 held by the spring plate 6 and which deforms in order to allow the reciprocating movement which is then communicated to the welding clamp 1.

The invention of course is not limited to the description given hereinabove and on the contrary covers any modifications that may be made thereto without departing from the scope thereof.

What is claimed is:

1. In a control device for a reciprocating member:
   a spring plate, one end of which is integral with said member and the other end of which is fixed;
   a rotatable cam positioned to support said spring plate under pressure;
   means for rotating said cam;
   bearing means connected to the movable end of said spring plate and supporting a shaft;
   a cam follower rotatably carried by said shaft and having a surface resting on the periphery of said cam; and
   an L-iron, one branch of which is fixed to the movable end of said spring plate and the other branch of which is fixed to said reciprocating member, said L-iron providing a degree of elasticity between its branches.

2. The control device according to claim 1, wherein the said member moving with a reciprocating movement is constituted by a welding and cutting clamp of a machine used for manufacturing plastic bags.

* * * * *